(12) United States Patent
Oh

(10) Patent No.: US 9,284,990 B2
(45) Date of Patent: Mar. 15, 2016

(54) DIRECT PINION MOUNT RZEPPA JOINT

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/282,037

(22) Filed: May 20, 2014

(65) Prior Publication Data

US 2014/0349771 A1    Nov. 27, 2014

Related U.S. Application Data

(60) Provisional application No. 61/826,668, filed on May 23, 2013, provisional application No. 61/839,462, filed on Jun. 26, 2013.

(51) Int. Cl.
| F16D 1/06 | (2006.01) |
| F16D 3/18 | (2006.01) |
| F16D 1/116 | (2006.01) |
| F16D 3/223 | (2011.01) |

(52) U.S. Cl.
CPC ........ *F16D 3/18* (2013.01); *F16D 1/116* (2013.01); *F16D 3/223* (2013.01); *F16D 2003/22313* (2013.01); *Y10S 464/906* (2013.01)

(58) Field of Classification Search
CPC ........... F16D 1/116; F16D 3/18; F16D 3/223; F16D 2003/22313; Y10S 464/906
USPC ............... 464/145, 182, 906; 403/342, 359.5, 403/DIG. 7
See application file for complete search history.

(56) References Cited

U.S. PATENT DOCUMENTS

| 1,756,335 | A | | 4/1930 | Bijur |
| 2,325,460 | A | | 9/1940 | Amberg |
| 2,844,013 | A | | 7/1958 | Spence |
| 3,460,427 | A | * | 8/1969 | Baumgarten ........... F16B 21/18 |
| 4,185,475 | A | | 1/1980 | Kleinschmidt et al. |
| 4,813,808 | A | | 3/1989 | Gehrke |
| 4,995,850 | A | | 2/1991 | Drift et al. |
| 5,665,001 | A | | 9/1997 | Jacob et al. |
| 6,780,114 | B2 | | 8/2004 | Sahashi et al. |
| 7,677,981 | B2 | | 3/2010 | Zierz et al. |
| 7,691,001 | B2 | | 4/2010 | Lutz et al. |

(Continued)

FOREIGN PATENT DOCUMENTS

| DE | 2703467 A1 | 8/1978 |
| DE | 102006026728 A1 | 12/2007 |

(Continued)

OTHER PUBLICATIONS

International Search Report and Written Opinion for Application No. PCT/US2014/067028 dated Jul. 6, 2015.

(Continued)

*Primary Examiner* — Gregory Binda
(74) *Attorney, Agent, or Firm* — Marshall & Melhorn, LLC

(57) ABSTRACT

One embodiment of a constant velocity joint has an inner race with a first set of splines. A sleeve is provided and it is engaged with the inner race. A drive nut connects the sleeve with a pinion shaft. In another embodiment, the sleeve may be provided with a boot groove. A clamping device may be used to secure a boot within the boot groove.

3 Claims, 14 Drawing Sheets

(56) References Cited

U.S. PATENT DOCUMENTS

| | | |
|---|---|---|
| 7,712,994 B2 | 5/2010 | Cermak |
| 7,867,099 B2 | 1/2011 | Szentmihalyi et al. |
| 7,896,749 B2 | 3/2011 | Booker |
| 8,070,613 B2 | 12/2011 | Cermak |
| 8,070,614 B2 | 12/2011 | Szentmihalyi et al. |
| 8,231,298 B2 | 7/2012 | Szentmihalyi |
| 8,262,489 B2 | 9/2012 | Valovick |
| 8,342,973 B2 | 1/2013 | Lutz |
| 2001/0016520 A1 | 8/2001 | Sahashi et al. |
| 2007/0149298 A1 | 6/2007 | Wormsbaecher |
| 2010/0143075 A1* | 6/2010 | Disser .................... F16B 21/18 |
| 2010/0267455 A1 | 10/2010 | Valovick |
| 2012/0004044 A1* | 1/2012 | Conger ................... F16D 1/116 |

FOREIGN PATENT DOCUMENTS

| | | |
|---|---|---|
| EP | 0275655 A1 | 7/1988 |
| EP | 2806180 A2 | 11/2014 |
| WO | 2008148373 A1 | 12/2008 |
| WO | 2012003261 A2 | 1/2012 |

OTHER PUBLICATIONS

International Search Report and Written Opinion for Application No. PCT/US2014/070499 dated Aug. 28, 2015.

Extended EP Search Report for Application No. 14169709.4 dated Oct. 16, 2015.

* cited by examiner

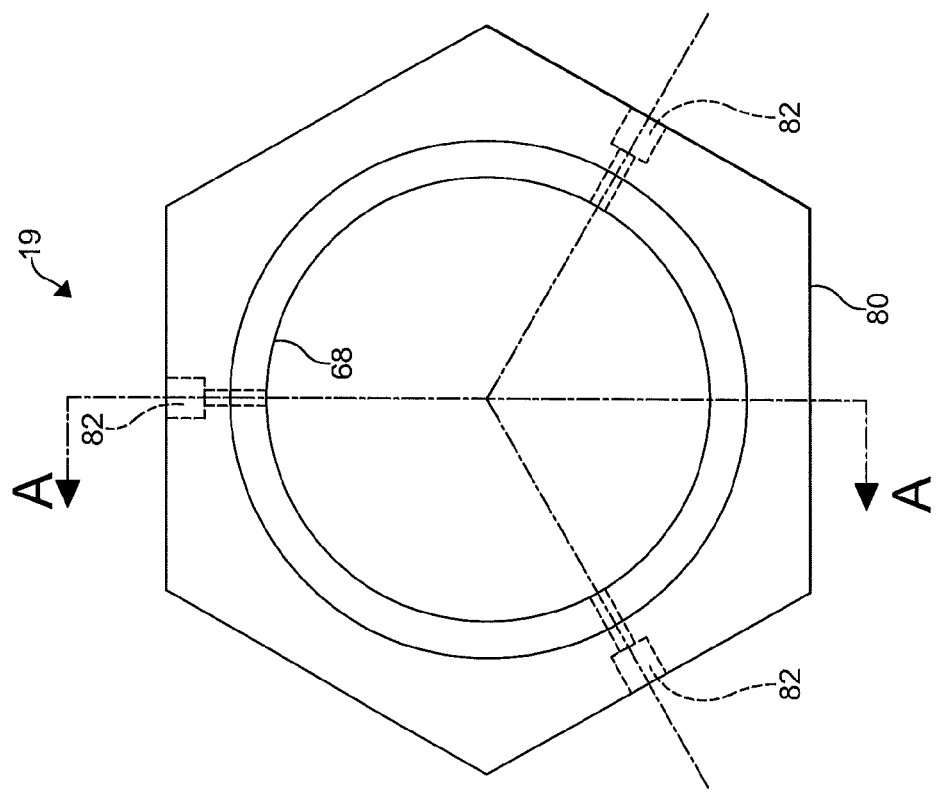
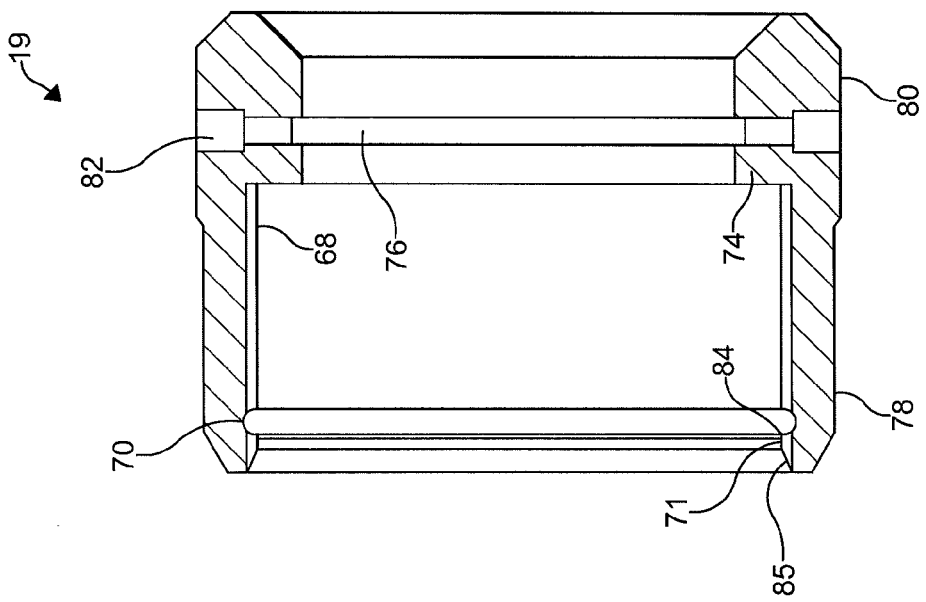

DIRECT PINION MOUNT RZEPPA JOINT

RELATED APPLICATIONS

This application claims priority to and the benefit of U.S. Provisional Application Ser. No. 61/826,668 filed on May 23, 2013 and U.S. Provisional Application Ser. No. 61/839,462 filed on Jun. 26, 2013, both of which are incorporated by reference herein.

BACKGROUND

FIG. 15 depicts one embodiment of a conventional plunging, or fixed constant velocity, joint 400. The joint 400 is connected to a propshaft 402 that is connected to axle or transmission (not shown). An outer race 404 has multiple bolt holes 406 that receive bolts 408. The bolts attach to an input or output flange 410. The flange 410 has an internal spline 412 that connects with an input or output shaft 413. A lock nut 414 is used to retaining the input or output shaft 412 axially. Finally, a stub shaft 416 connects the CV joint 400 to the tube shaft 402. Therefore, in the conventional art, auxiliary components such as the stub shaft 416, the flange 410 for the input or output shaft 412, lock nut 414, bolts 408, and bolt holes 406 of the outer race 404 are additionally needed for applying the CV joint 400 to the propshaft 402. These components increase weight and production cost, lower transmission efficiency, and make assembly process more complicated.

Other prior art designs also have disadvantages. In one case, an output shaft is connected directly to the constant velocity joint inner race through a spline. Therefore, the direct spline connection between the inner race and the output shaft makes the length of the outer shaft longer. This design could cause potential excessive heat treat deformation and consequently lead to extra cost to meet quality requirements.

Additionally, the output shaft in this design is axially retained by multiple fingers of an annular arm. A special tool would be required to take the output shaft out of the inner race spline and do some damages to the parts during disassembly. In another design, the output shaft is axially retained by a snap ring installed on a groove formed on inner cylindrical surface of an extended inner race portion and the output shaft. This design might require a person repairing or replacing the joint to cut the arm off to take the output shaft out of the inner race. Therefore these two applications have a disadvantage of difficulty in serviceability for part replacement.

SUMMARY

One embodiment of a constant velocity joint has an inner race with a first set of splines. A sleeve is provided with a first end portion, a second end portion and a middle portion. The first end portion has a second set of splines engaged with the first set of splines. The middle portion abuts the inner race and the second end portion has a first set of threads on an outer surface and a third set of splines on an inside surface. A drive nut is provided with an inner surface having a second set of threads engaged with a first set of threads, a first snap ring groove and a second snap ring groove. A pinion shaft is also provided with a fourth set of splines engaged with the third set of splines, a third snap ring groove and a fourth snap ring groove. A first snap ring is located in the first and the third snap ring grooves and a second snap ring is located in the second and the fourth snap ring grooves.

In another embodiment, the sleeve may be provided with a boot groove. A clamping device may be used to secure a boot within the boot groove.

BRIEF DESCRIPTION OF THE DRAWINGS

The invention will now be described, by way of example only, with reference to the accompanying drawings in which:

FIG. 4 is a cutaway side view of a component from FIG. 1;

FIG. 5 is an end view of the component of FIG. 4;

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
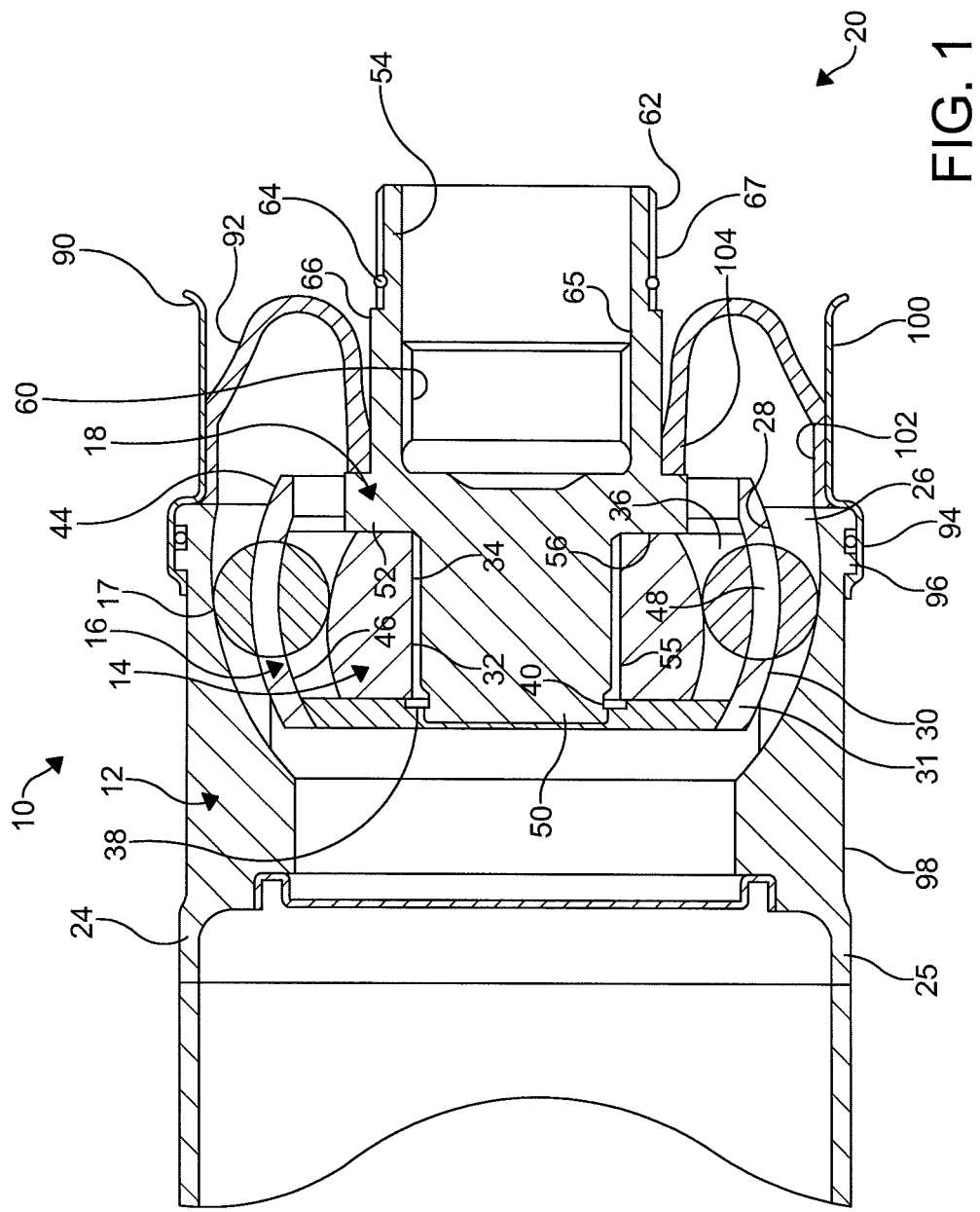
FIG. 1 is a partial cutaway side view of one embodiment of components of a constant velocity joint.
Figure 2:
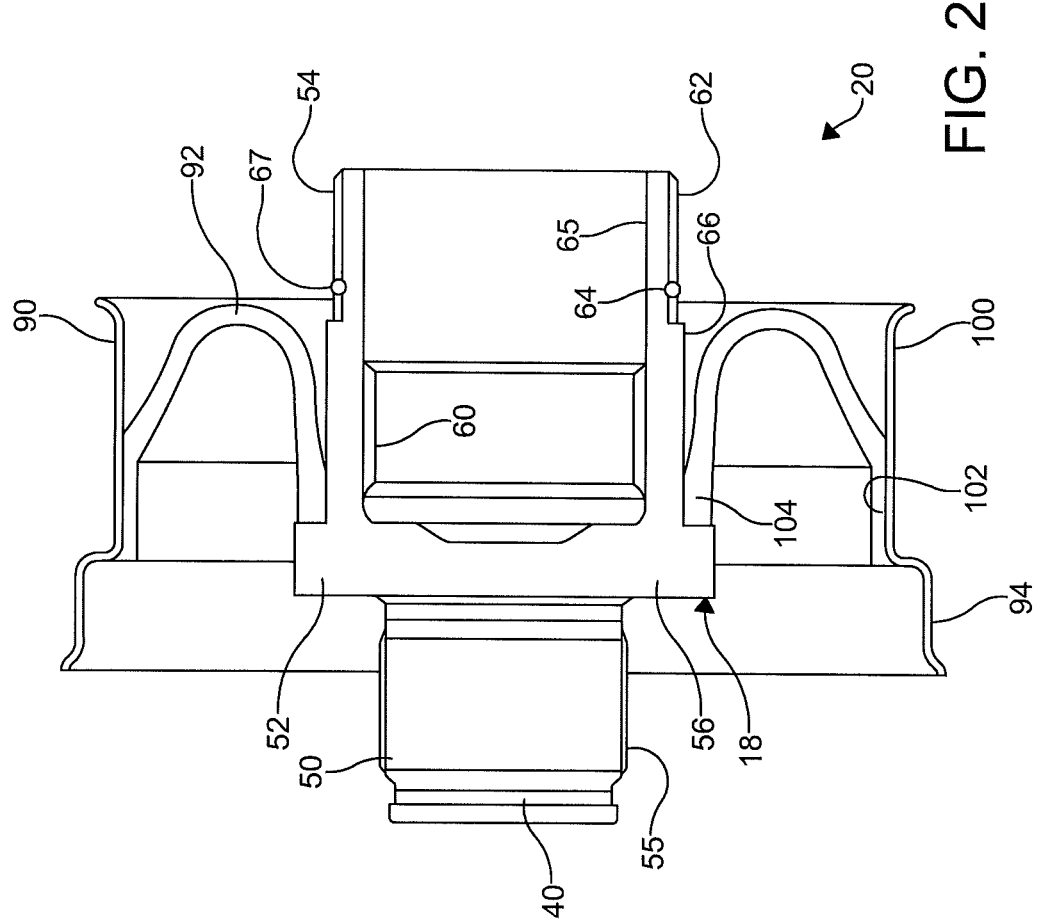
FIG. 2 is a partial cutaway side view of components depicted in FIG. 1.

FIG. 1 illustrates a constant velocity joint 10 according to one embodiment. The constant velocity joint 10 includes an outer race 12, an inner race 14, a cage 16, a plurality of torque transferring elements 17, a drive sleeve 18, a drive nut 19 (shown in FIGS. 3-9), and a boot assembly 20. A plug-in pinion shaft 22 (shown in FIGS. 3, 6, 7, 8 and 10) is drivingly engaged with the drive sleeve 18, and the drive sleeve 18 is drivingly engaged with the inner race 14. The constant velocity joint 10 is a Rzeppa style constant velocity joint; however, it is understood that the constant velocity joint 10 may be any other type of constant velocity joint.

The outer race 12 is a hollow cylindrical body formed from a rigid material such as a steel. The outer race 12 is typically forged and then machined in a secondary operation. However, it is understood the outer race 12 may be formed using other processes from any rigid material. An attachment end 24 is formed in the outer race 12, and is drivingly engaged with a hollow input shaft 25. Alternately, it is understood that the attachment end 24 may be coupled to any other type of member.

A plurality of outer tracks 26 are formed in an inner surface 28 of the outer race 12. Each of the outer tracks 26 has an arcuate profile which follows an arcuate path, the arcuate path having a center point different from a center point of the constant velocity joint 10. The outer race 12 includes six outer tracks 26 formed therein. However, it is understood that each of the outer tracks 26 may have a non-arcuate profile and any number of the outer tracks 26 may be formed in the outer race 12. The plurality of outer tracks 26 is equally spaced about the axis of the outer race 12.

The inner surface 28 is a spherical surface of the outer race 12 having a center point common with the center point of the constant velocity joint 10. A radius of the inner surface 28 is complementary to an outer surface 30 of the cage 16. The plurality of outer tracks 26 and the inner surface 28 are precision machined for use as surfaces of a constant velocity joint as is known in the art.

The inner race 14 is a hollow member formed from a rigid material such as a steel. It is understood that the inner race 14 may be formed using any conventional process from any rigid material. When the drive sleeve 18 is drivingly engaged with the inner race 14, the inner race 14 is typically spliningly disposed on an end portion of drive sleeve 18.

The inner race 14 includes an inner race outer surface 31 and an inner race inner surface 32. The inner race outer surface 31 is a spherical surface of the inner race 14 having a center point common with the center point of the constant velocity joint 10. The inner race inner surface 32 defines a cylindrical bore through the inner race 14. A plurality of splines 34 is formed on the inner race inner surface 32 for drivingly engaging the inner race 14 with the drive sleeve 18.

Figure 6:
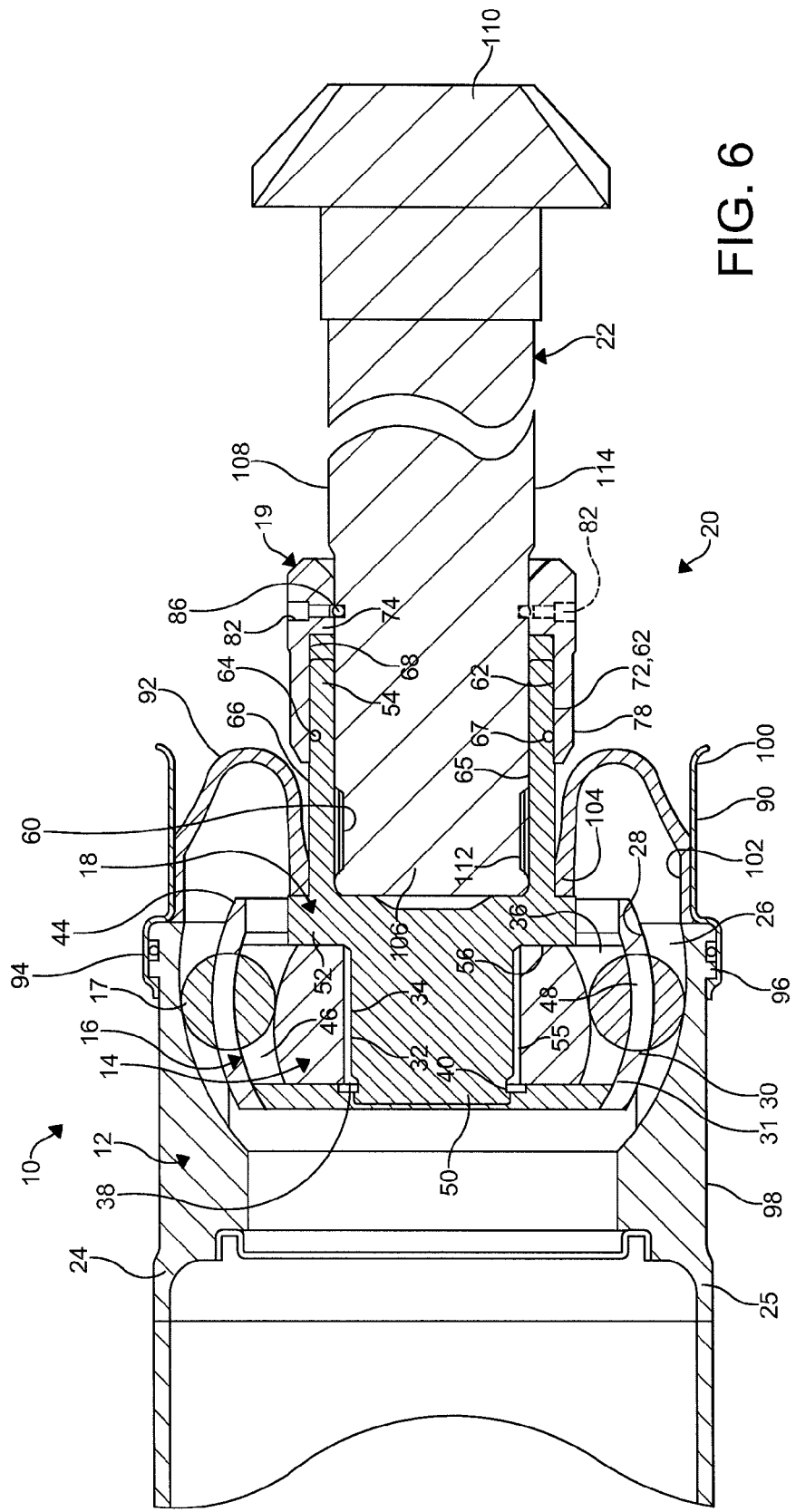
FIG. 6 is a partial cutaway side view of the constant velocity joint of FIG. 1 with the components assembled.

A plurality of inner tracks 36 are formed in the inner race outer surface 30. Each of the inner tracks 36 has an arcuate profile which follows an arcuate path, the arcuate path having a center point different from a center point of the constant velocity joint 10. The diameter of the arcuate profile of each of the inner tracks 36 is complementary to the diameter of the arcuate profile of each of the outer tracks 26 corresponding thereto. As shown in FIGS. 1, 5, and 6, a depth of each of the inner tracks 36 varies depending on a distance the inner race outer surface 31 is from the axis of the inner race 14. The inner race 14 includes six inner tracks 36 formed therein. However, it is understood that each of the inner tracks 36 may have a non-arcuate profile and any number of the inner tracks 36 may be formed in the inner race 14. The plurality of inner tracks 36 is equally spaced about the axis of the inner race 14.

The inner race 14 is secured to the drive sleeve 18 using a snap ring 38 disposed in a groove 40 formed in an outer surface of the drive sleeve 18. Alternately, any other type of fastener may be used to secure the inner race 14 to the drive sleeve 18.

The cage 16 is disposed between the outer race 12 and the inner race 14. The cage 16 is a hollow body machined from a rigid material such as steel. However, it is understood the cage 16 may be formed using other processes from any rigid material. The cage 16 includes a spherical outer surface 44 and a spherical inner surface 46. A plurality of perforations 48 is formed through the cage 16.

The spherical outer surface 44 has a center point common with the center point of the constant velocity joint 10. The spherical outer surface 44 defines a portion of each of the perforations 48. The spherical outer surface 44 is disposed against and slidingly engages the inner surface 28 of the outer race 12. A diameter of the spherical outer surface 44 is complementary to the inner surface 28 of the outer race 12. The spherical outer surface 44 and the inner surface 28 are precision machined for use as mating surfaces of a constant velocity joint as is known in the art.

The spherical inner surface 46 has a center point common with the center point of the constant velocity joint 10. The spherical inner surface 46 defines a portion of each of the perforations 48. The spherical inner surface 46 is disposed against and slidingly engages the inner race outer surface 30. A radius of the spherical inner surface 46 is complementary to a radius of the inner race outer surface 30. The spherical inner surface 46 and the inner race outer surface 31 are precision machined for use as mating surfaces of a constant velocity joint as is known in the art.

The plurality of torque transferring elements 17 comprises steel spheres disposed in each of the perforations 48, the outer tracks 26, and the inner tracks 36. Each of the torque transferring elements 17 is a ball bearing as is known in the art. However, it is understood that the plurality of torque transferring elements 17 may be any other shape and formed from any other rigid material. A diameter of each of the torque transferring elements 17 is complementary to the diameter of the arcuate profiles of each of the outer tracks 26 and the inner tracks 36. The torque transferring elements 17, the outer tracks 26, and the inner tracks 36 are precision machined for use as mating surfaces of a constant velocity joint as is known in the art. One torque transferring element 17 is disposed and in sliding engagement with each of the outer tracks 26 and each of the inner tracks 36.

The drive sleeve 18 is an annular member formed from a rigid material such as a steel. It is understood that the drive sleeve 18 may be formed using any conventional process from any rigid material. The drive sleeve 18 is disposed against and is in driving engagement with the inner race 14. The drive sleeve 18 comprises a first end portion 50, a middle portion 52, and a second end portion 54. The first end portion 50 is drivingly engaged with the inner race 14, the middle portion 52 is disposed against the inner race 14, and the second end portion 54 is drivingly engaged with the plug-in pinion shaft 22.

The first end portion 50 is a cylindrical shaped portion of the drive sleeve 18 spliningly engaged with the inner race 14. A plurality of splines 55 are formed in an outer surface of the first end portion 50. Alternately, it is understood that the drive sleeve 18 may be unitarily formed with the inner race 14 or coupled thereto in any conventional manner. The groove 40 is formed in the first end portion 50 of the drive sleeve 18.

The middle portion 52 is a substantially disk shaped portion of the drive sleeve 18 located between the first end portion 50 and the second end portion 54. The middle portion 52 has a diameter greater than a diameter of the first end portion 50. The middle portion 52 defines a sleeve seat 56 of the drive sleeve 18. When the first end portion 50 is drivingly engaged with the inner race 14, the sleeve seat 56 is disposed against a portion of the inner race 14.

The second end portion 54 is a hollow portion of the drive sleeve 18 formed opposite the first end portion 50. The second end portion 54 comprises a plurality of inner splines 60, an outer thread 62, and a ring groove 64. The second end portion 54 is sealingly engaged with a portion of the boot assembly 20.

The plurality of inner splines 60 is formed on an inner surface 65 of the second end portion 54 for drivingly engaging the plug-in pinion shaft 22. Alternately, it is understood that the second end portion 54 may be coupled to the plug-in pinion shaft 22 in any manner that permits sliding engagement.

The outer thread 62 is formed on an outer surface 66 of the second end portion 54 for threadingly engaging the drive nut 19. Alternately, it is understood that the second end portion 54 may be configured to be engaged with the drive nut 19 in any conventional manner. The outer surface of the second end portion 54 is sealingly engaged with a portion of the boot assembly 20.

The ring groove 64 is an annular recess defined by the outer surface 66 of the second end portion 54. The ring groove 64 receives a sleeve snap ring 67 which in addition to the outer thread 62, secures the drive nut 19 to the drive sleeve 18. Alternately, it is understood that the second end portion 54 may be configured with another feature to secure the drive nut 19 to the drive sleeve 18.

The drive nut 19 is a hollow annular member formed from a rigid material such as a steel. The drive nut 19 is most clearly illustrated in FIGS. 4 and 5. It is understood that the drive nut 19 may be formed using any conventional process from any rigid material. When the constant velocity joint 10 is assembled, the drive sleeve 18 is partially disposed about and is threadingly engaged with the drive sleeve 18. The drive nut 19 comprises an inner surface 68 which defines a first snap ring recess 70, a distal inner surface 71, an inner thread 72, a sleeve shoulder 74, and a second snap ring recess 76. The drive nut 19 further comprises an outer surface 78 which defines a fastening portion 80. A plurality of release perforations 82 are formed through the drive nut 19.

The first snap ring recess 70 is an annular recess defined by the inner surface 68 of the drive nut 19. The first snap ring recess 70 receives the sleeve snap ring 67 when the drive nut 19 is disposed and engaged with the drive sleeve 18. Alternately, it is understood that the inner surface 68 may be configured with another feature to secure the drive nut 19 to the drive sleeve 18. As most clearly shown in FIG. 4, the inner surface 68 also defines a first chamfered surface 84 adjacent the first snap ring recess 70 to facilitate removal of the drive nut 19 from the drive sleeve 18 and a second chamfered surface 85 adjacent a distal end of the drive nut 19 to facilitate compression of the sleeve snap ring 67 during assembly of the constant velocity joint 10.

The distal inner surface 71 is an unthreaded portion of the inner surface 68 formed between the first chamfered surface 84 and the second chamfered surface 85. The distal inner surface 71 is most clearly shown in FIG. 8. A diameter of the distal inner surface 71 is greater than a diameter of the inner thread 72.

The inner thread 72 is formed on the inner surface 68 of the drive nut 19 for threadingly engaging the outer thread 62 of the drive sleeve 18. Alternately, it is understood that the inner surface 68 may be configured to be engaged with the drive sleeve 18 in any conventional manner.

The inner surface 68 defines the sleeve shoulder 74 of the drive nut 19. The sleeve shoulder 74 is a stepped portion of the drive nut 19. When the constant velocity joint 10 is assembled, the sleeve shoulder 74 is disposed against the second end portion 54 of the drive sleeve 18.

The second snap ring recess 76 is an annular recess defined by the inner surface 68 of the drive nut 19. The second snap ring recess 76 receives a pinion shaft snap ring 86 to couple the drive nut 19 to the plug-in pinion shaft 22 while permitting relative rotation therebetween. Alternately, it is understood that the inner surface 68 may be configured with another feature to couple the drive nut 19 to the plug-in pinion shaft 22. As most clearly shown in FIG. 8, the plurality of release perforations 82 intersects the second snap ring recess 76.

The outer surface 78 defines the fastening portion 80 of the drive nut 19. As most clearly shown in FIGS. 5 and 9, the fastening portion 80 is a hexagonal shaped portion of the drive nut 19 for drivingly engaging a driving tool (not shown); however, it is understood that the fastening portion 80 may include other features formed therein for engaging other drive tools.

Each of the release perforations 82 is a stepped and threaded perforation formed through the drive nut 19. Each of the release perforations 82 extends from the fastening portion 80 to the second snap ring recess 76. A release fastener 88 is threadingly disposed in each of the release perforations 82. In response to a rotation of each of the release fasteners 88, a force applied to the pinion shaft snap ring 86 may be adjusted. In response to an adjustment of force applied to the pinion shaft snap ring 86, a diameter of the pinion shaft snap ring 86 changes.

The boot assembly 20 comprises a boot retainer 90 and a boot 92. The boot assembly 20 is disposed on the outer race 12 and is in sealing engagement with the drive sleeve 18. The boot 92 is coupled to the boot retainer 90.

The boot retainer 90 is an annular member formed from a rigid material, such as a metal or a plastic. The boot retainer 90 is coupled to and is sealingly engaged with the outer race 12. A first end portion 94 of the boot retainer 90 engages a shoulder 96 formed in an outer surface 98 of the outer race 12; however, it is understood that the boot retainer 90 may be coupled to the outer race 12 in any manner. A second end portion 100 has a substantially J-shaped cross-section and partially encloses a portion of the boot 92 to couple the boot 92 to the boot retainer 90. Alternately, the second end portion 100 may other shapes that facilitate coupling the boot 92 to the boot retainer 90.

The boot 92 is an annular member having a substantially U-shaped cross-section formed from a resilient material, such as an elastomer. The boot 92 facilitates movement between the outer race 12 and the drive sleeve 18 while sealing engagement is maintained therebetween. A first end portion 102 of the boot 92 is coupled to the boot retainer 90 as described hereinabove. A second end portion 104 of the boot 92 is sealingly engaged with or coupled to the outer surface 66 of the second end portion 54 of the drive sleeve 18.

Figure 3:
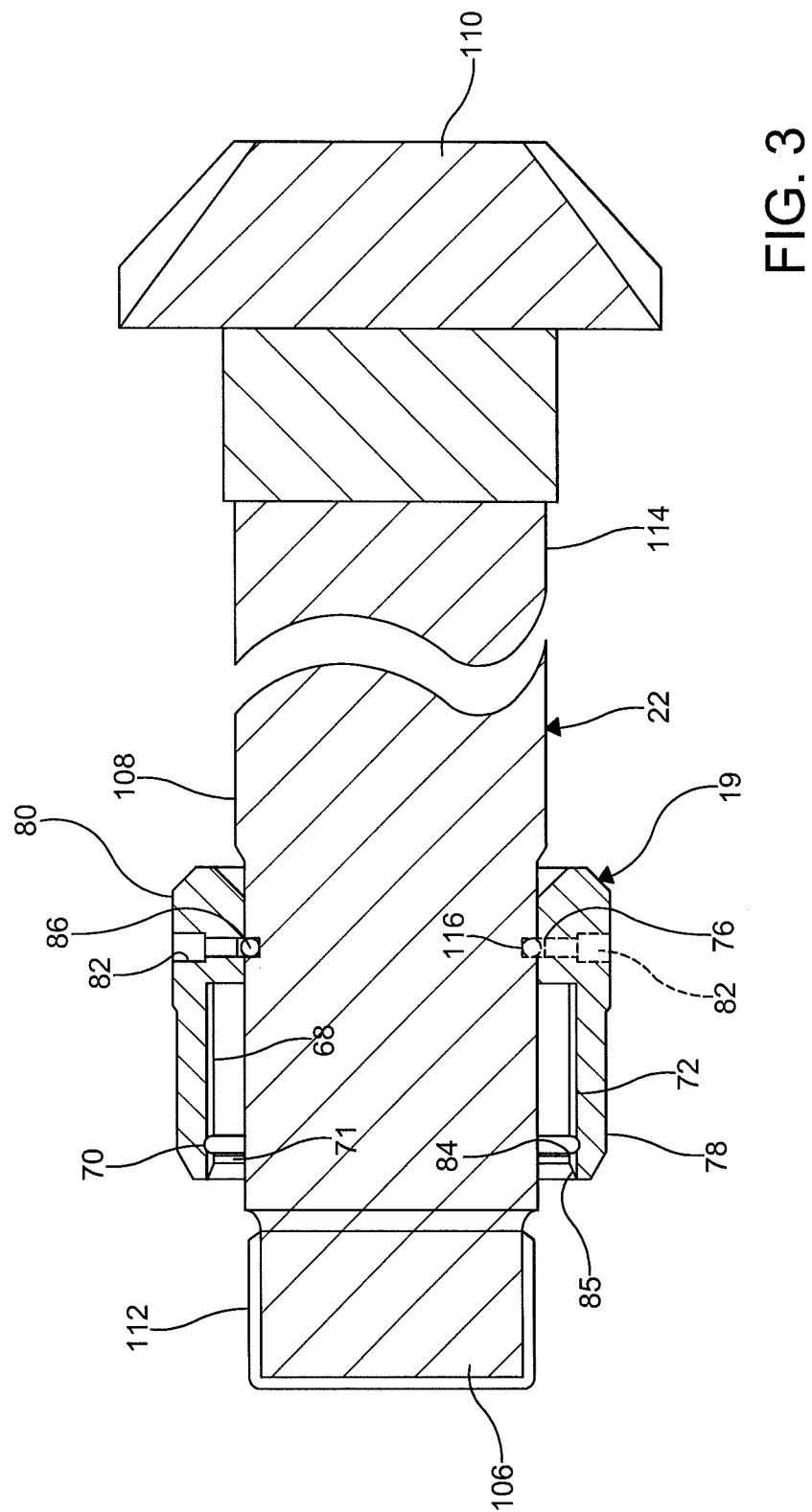
FIG. 3 is a partial cutaway side view of additional structure of the constant velocity joint.
Figure 7:
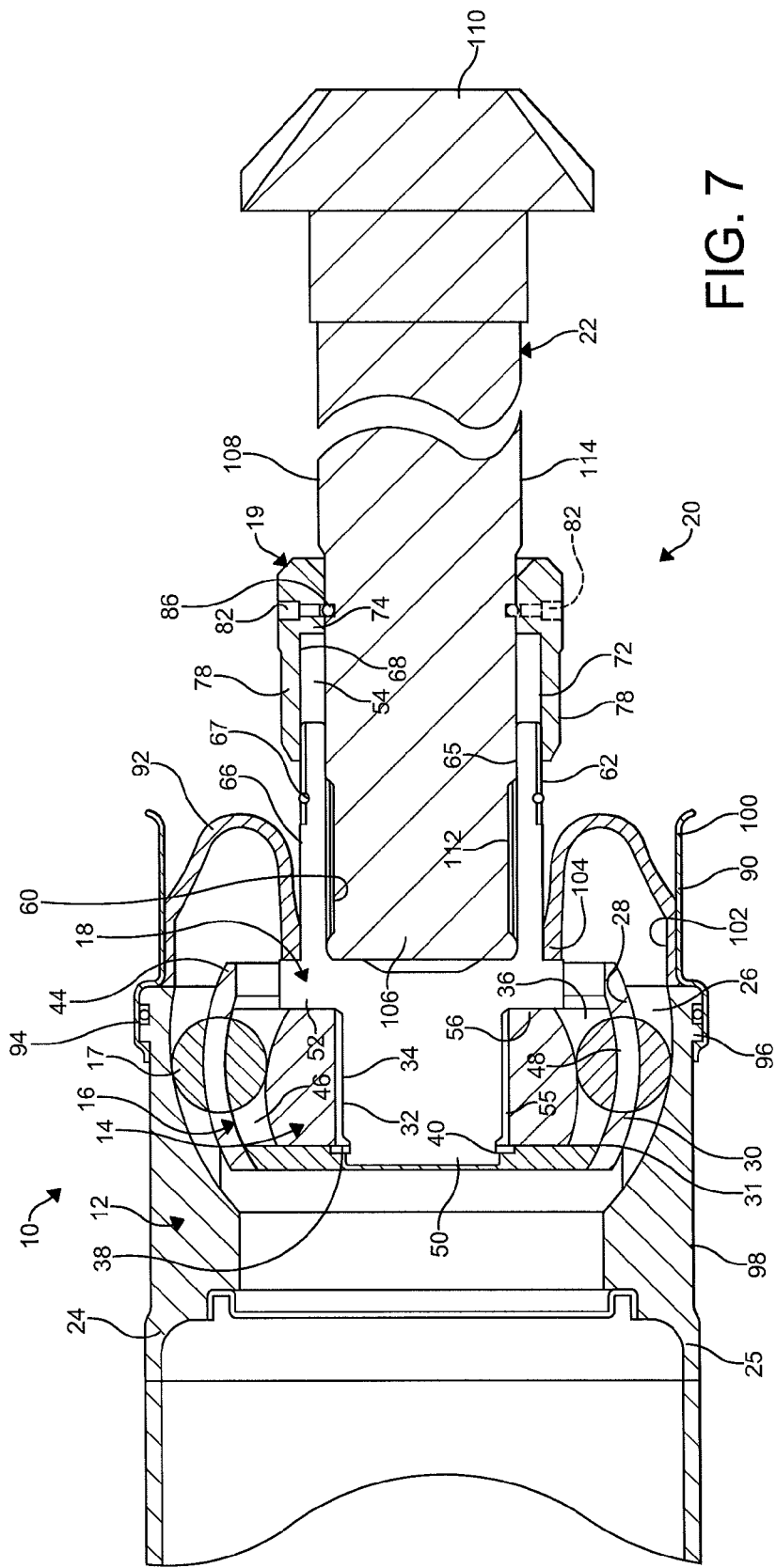
FIG. 7 is a partial cutaway side view of the constant velocity joint of FIG. 6 in an assembly step.

The plug-in pinion shaft 22, which is most clearly shown in FIGS. 3, 6 and 7 is an elongate member which is drivingly engaged with the drive sleeve 18 when the constant velocity joint 10 is assembled. The plug-in pinion shaft 22 is formed from a rigid material such as steel using any conventional process. The plug-in pinion shaft 22 comprises a first end portion 106, a middle portion 108, and a second end portion 110.

The first end portion 106 is a cylindrical shaped portion of the plug-in pinion shaft 22 formed opposite the second end portion 110. The first end portion 106 comprises a plurality of outer splines 112 corresponding to the inner splines 60 of the drive sleeve 18. When the constant velocity joint 10 is assembled, the plug-in pinion shaft 22 is drivingly engaged with the drive sleeve 18 through the splines 112, 60. The plurality of outer splines 112 is formed on an outer surface 114 of the plug-in pinion shaft 22. Alternately, it is understood that the plug-in pinion shaft 22 may be drivingly engaged with the plug-in pinion shaft 22 in any manner that permits sliding engagement.

The middle portion 108 is a cylindrical shaped portion of the plug-in pinion shaft 22 formed between the first end portion 106 and the second end portion 110. The outer surface 114 defines a shaft snap ring recess 116 in the middle portion 108. The shaft snap ring recess 116 receives a pinion shaft snap ring 86 to couple the drive nut 19 to the plug-in pinion shaft 22 while permitting relative rotation therebetween.

The second end portion 110 is configured to be drivingly engaged with a drive component (not shown). As most clearly shown in FIG. 3, the second end portion 110 is a beveled pinion gear; however, it is understood that the second end portion 110 may be configured in any manner that permits driving engagement between the plug-in pinion shaft 22 and the drive component.

In use, the constant velocity joint 10 including the drive sleeve 18, the drive nut 19, and the plug-in pinion shaft 22 facilitates assembly and disassembly of the constant velocity joint 10. Prior to assembly of the constant velocity joint 10, the outer race 12, the inner race 14, the cage 16, the plurality of torque transferring elements 17, the drive sleeve 18, and the boot assembly 20 are configured as shown in FIG. 1. Further, the drive nut 19 and the plug-in pinion shaft 22 are configured as shown in FIG. 3. In FIG. 3, the drive nut 19 is rotatably coupled to the plug-in pinion shaft 22 with the pinion shaft snap ring 86, which is partially disposed in the second snap ring recess 76 and the shaft snap ring recess 116.

FIG. 7 illustrates assembly of the constant velocity joint 10. First, the first end portion 106 of the plug-in pinion shaft 22 is disposed in the second end portion 54 of the drive sleeve 18. The outer splines 112 of the plug-in pinion shaft 22 are aligned with the inner splines 60 of the drive sleeve 18 and the plug-in pinion shaft 22 is inserted into the drive sleeve 18 until the inner thread 72 of the drive nut 19 contacts the outer thread 62 of the drive sleeve 18. Next, the drive nut 19 is rotated on the plug-in pinion shaft 22 to engage the inner thread 72 with the outer thread 62. The drive nut 19 is rotated until the second chamfered surface 85 contacts the sleeve snap ring 67. Further rotation of the drive nut 19 causes the second chamfered surface 85 to apply a radially inwardly directed force to the sleeve snap ring 67, compressing the sleeve snap ring 67 against the distal inner surface 71. Once the sleeve snap ring 67 is compressed against the distal inner surface 71 of the drive nut 19, the inner thread 72 is free to further engage the outer thread 62 through further rotation of the drive nut 19. The distal inner surface 71 of the drive nut 19 reduces a rotational resistance between the drive nut 19 and the drive sleeve 18, facilitating assembly of the constant velocity joint 10 and the plug-in pinion shaft 22. The drive nut 19 is further rotated until the first snap ring recess 70 is substantially aligned with the sleeve snap ring 67 and the ring groove 64. Once the first snap ring recess 70 is substantially aligned with the sleeve snap ring 67 and the ring groove 64, the sleeve snap ring 67, expands partially into the first snap ring recess 70 while also remaining in the ring groove 64.

Figure 8:
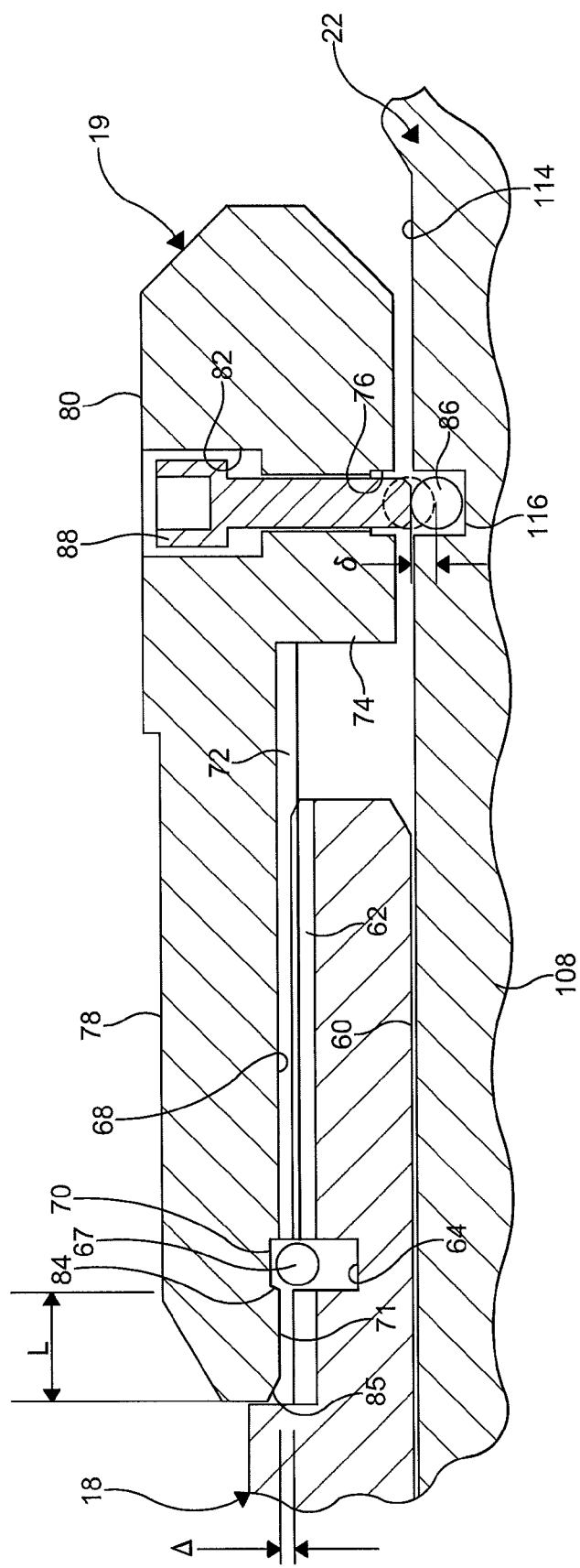
FIG. 8 is a partial cutaway side view of a detail of the constant velocity joint of FIG. 6.
Figure 9:
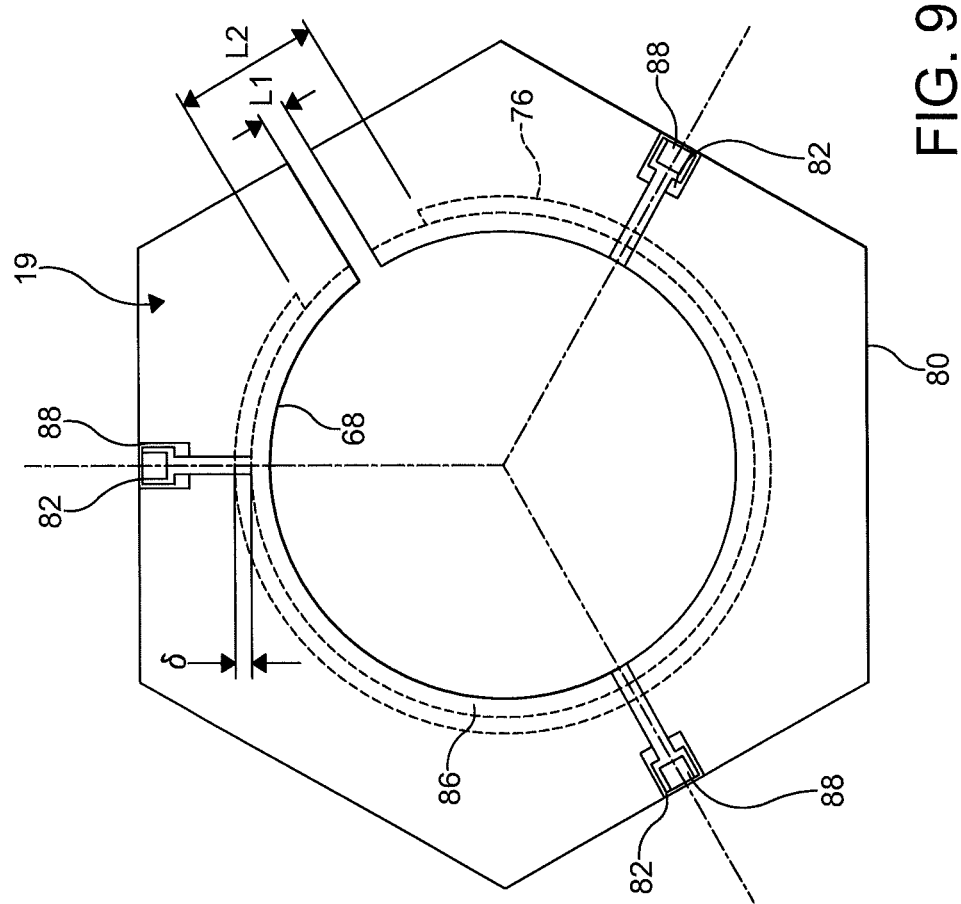
FIG. 9 is an end view of one of the components depicted in FIG. 7.

FIG. 8 illustrates the sleeve snap ring 67 expanded partially into the first snap ring recess 70 while also remaining in the ring groove 64. Such a position of the sleeve snap ring 67 militates against rotation of the drive nut 19 with respect to the drive sleeve 18 and the plug-in pinion shaft 22. Such a position of the sleeve snap ring 67 also militates against an axial movement of the plug-in pinion shaft 22, which prevents the outer splines 112 of the plug-in pinion shaft 22 from becoming disengaged from the inner splines 60 of the drive sleeve 18.

Figure 10:
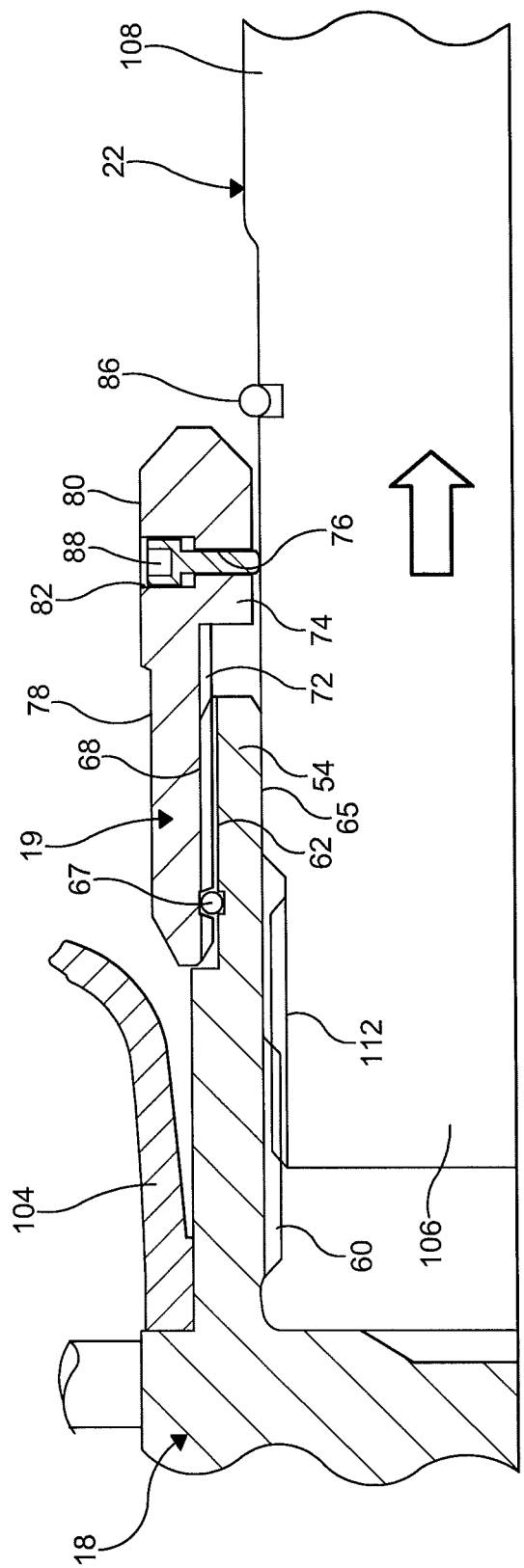
FIG. 10 is a partial cutaway side view of a detail of the constant velocity joint of FIG. 6 in a disassembly step.

FIGS. 8 and 10 illustrate disassembly of the plug-in pinion shaft 22 from the constant velocity joint 10. Disassembly of the plug-in pinion shaft 22 from the constant velocity joint 10 begins by displacing the pinion shaft snap ring 86 from the second snap ring recess 76. The pinion shaft snap ring 86 is displaced from the second snap ring recess 76 by the release fasteners 88. Each of the release fasteners 88 are adjusted to further extend radially inwardly from each of the release fasteners 88, causing each of the release fasteners 88 to contact the pinion shaft snap ring 86. Contact between each of the release fasteners 88 and the pinion shaft snap ring 86 applies a radially inwardly directed force to the pinion shaft snap ring 86, compressing the pinion shaft snap ring 86 and displacing the pinion shaft snap ring 86 from the second snap ring recess 76. Once the pinion shaft snap ring 86 is displaced from the second snap ring recess 76, the plug-in pinion shaft 22 may be moved axially with respect to the drive nut 19, and the plug-in pinion shaft 22 may be disengaged from the drive sleeve 18 by applying an axially directed force to the plug-in pinion shaft 22 away from the drive sleeve 18.

Disassembly of the constant velocity joint 10 may continue by removing the drive nut 19 from the drive sleeve 18. The drive nut 19 is rotated to disengage the inner thread 72 of the drive nut 19 from the outer thread 62 of the drive sleeve 18. The drive nut 19 is rotated until the first chamfered surface 84 contacts the sleeve snap ring 67. Further rotation of the drive nut 19 causes the first chamfered surface 84 to apply a radially inwardly directed force to the sleeve snap ring 67, compressing the sleeve snap ring 67 against the distal inner surface 71 of the drive nut 19. Once the sleeve snap ring 67 is compressed against the distal inner surface 71 of the drive nut 19, the inner thread 72 is free to be further disengaged from the outer thread 62 through further rotation of the drive nut 19. The distal inner surface 71 of the drive nut 19 reduces a rotational resistance between the drive nut 19 and the drive sleeve 18, facilitating disassembly of the constant velocity joint 10 and the plug-in pinion shaft 22. The drive nut 19 is further rotated until the inner thread 72 is fully disengaged from the outer thread 62, at which point the drive nut 19 may be removed from the drive sleeve 18.

Figure 11:
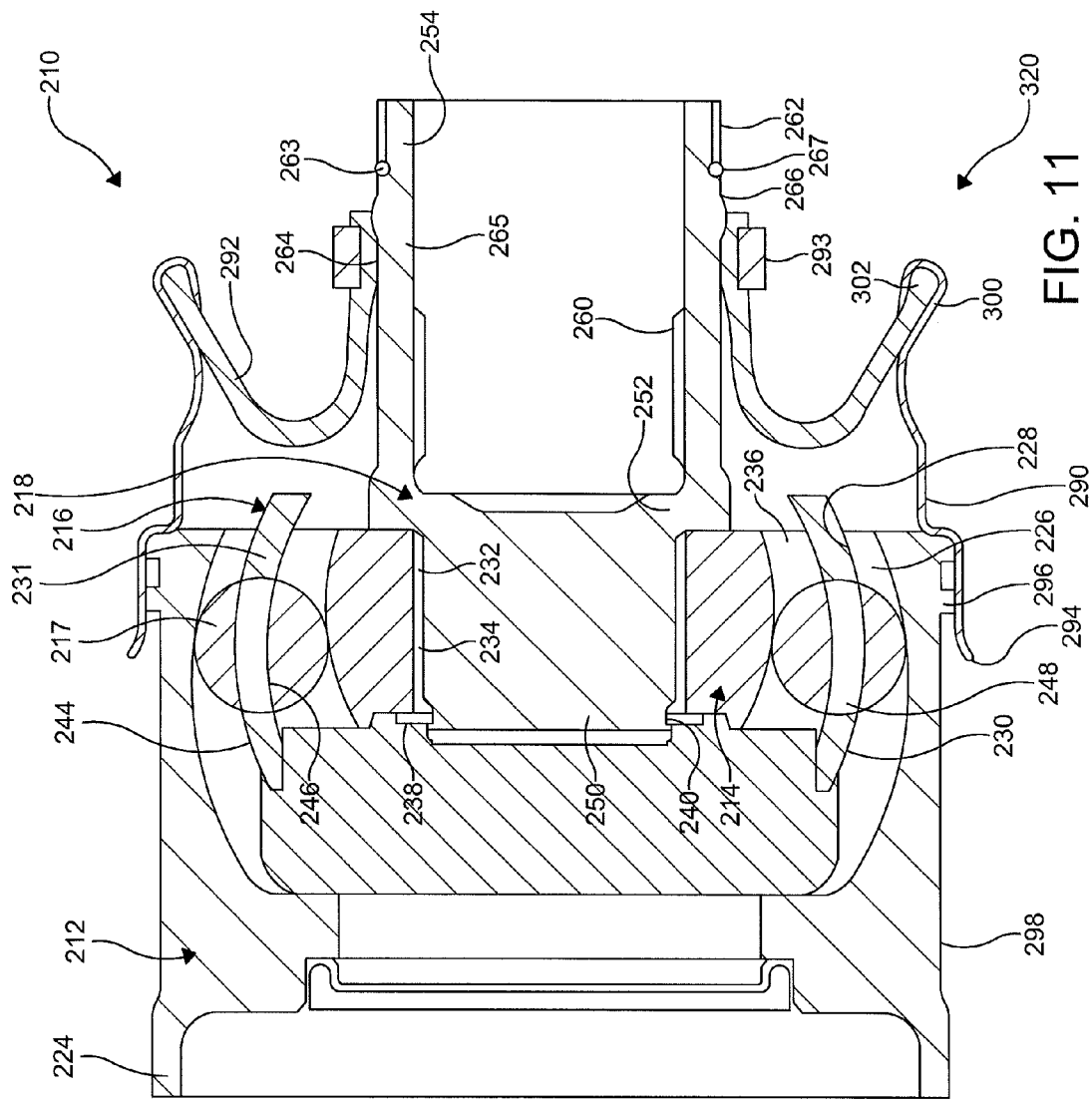
FIG. 11 is a partial cutaway side view of another embodiment of components of a constant velocity joint.

FIG. 11 illustrates a constant velocity joint 210 according to an embodiment of the invention. The constant velocity joint 210 includes an outer race 212, an inner race 214, a cage 216, a plurality of torque transferring elements 217, a drive sleeve 218, a drive nut 219 (shown in FIGS. 13 and 14), and a boot assembly 220. A plug-in pinion shaft 222 (shown in FIG. 13) is drivingly engaged with the drive sleeve 218, and the drive sleeve 218 is drivingly engaged with the inner race 214. The constant velocity joint 210 is a Rzeppa style constant velocity joint; however, it is understood that the constant velocity joint 210 may be any other type of constant velocity joint.

The outer race 212 is a hollow cylindrical body formed from a rigid material such as a steel. The outer race 212 is typically forged and then machined in a secondary operation. However, it is understood the outer race 212 may be formed using other processes from any rigid material. An attachment end 224 is formed in the outer race 212, and is drivingly engaged with a shaft (not shown). Alternately, it is understood that the attachment end 224 may be coupled to any other type of member.

A plurality of outer tracks 226 are formed in an inner surface 228 of the outer race 212. Each of the outer tracks 226 has an arcuate profile which follows an arcuate path, the arcuate path having a center point different from a center point of the constant velocity joint 210. The outer race 212 includes six outer tracks 226 formed therein. However, it is understood that each of the outer tracks 226 may have a non-arcuate profile and any number of the outer tracks 226 may be formed in the outer race 212. The plurality of outer tracks 226 is equally spaced about the axis of the outer race 212.

The inner surface 228 is a spherical surface of the outer race 212 having a center point common with the center point of the constant velocity joint 210. A radius of the inner surface 228 is complementary to an outer surface 230 of the cage 216. The plurality of outer tracks 226 and the inner surface 228 are precision machined for use as surfaces of a constant velocity joint as is known in the art.

The inner race 214 is a hollow member formed from a rigid material such as a steel. It is understood that the inner race 214 may be formed using any conventional process from any rigid material. When the drive sleeve 218 is drivingly engaged with the inner race 214, the inner race 214 is typically spliningly disposed on an end portion of drive sleeve 218.

The inner race 214 includes an inner race outer surface 231 and an inner race inner surface 232. The inner race outer surface 231 is a spherical surface of the inner race 214 having a center point common with the center point of the constant velocity joint 210. The inner race inner surface 232 defines a cylindrical bore through the inner race 214. A plurality of splines 234 is formed on the inner race inner surface 232 for drivingly engaging the inner race 214 with the drive sleeve 218.

Figure 13:
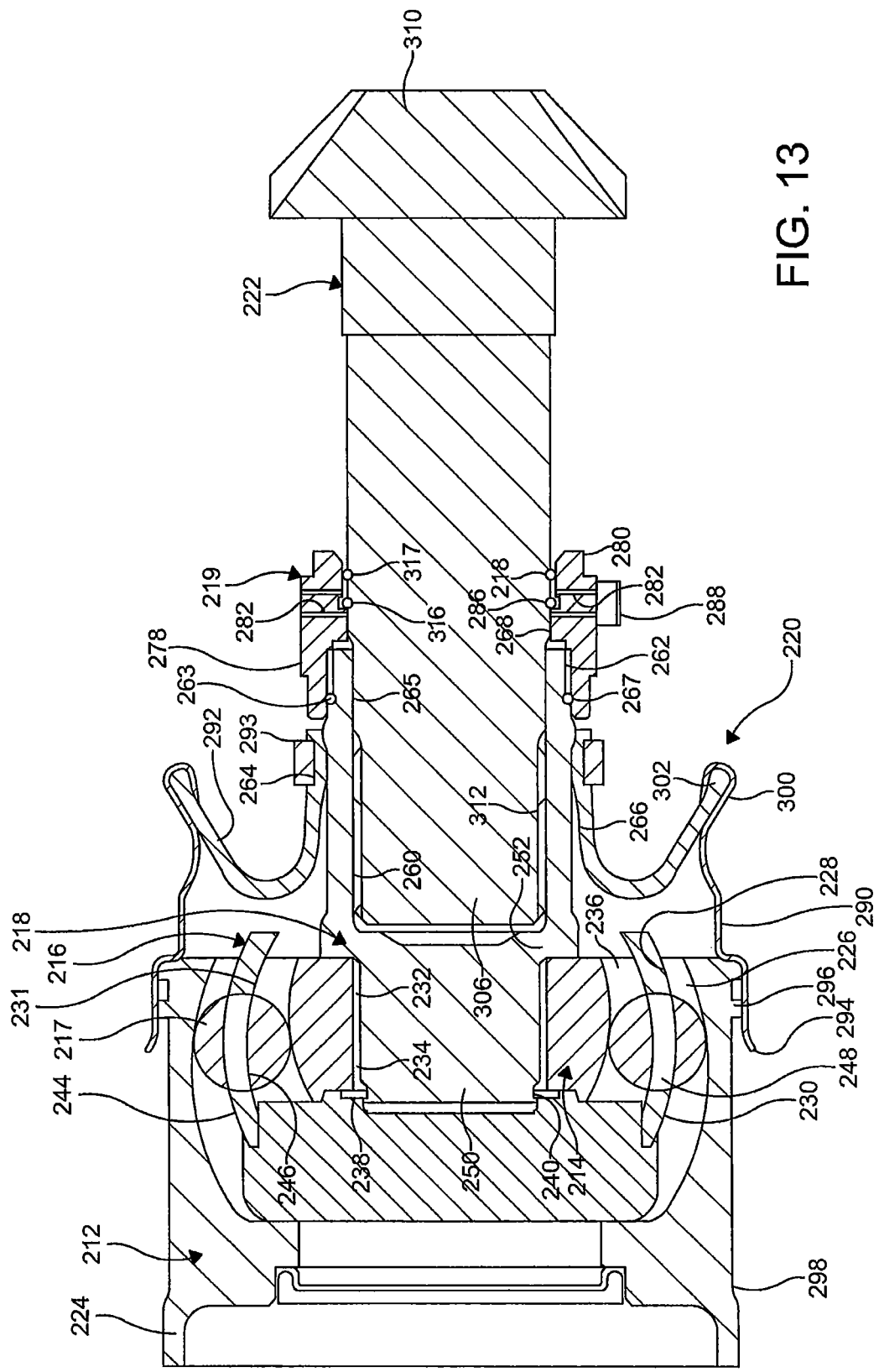
FIG. 13 is a partial cutaway side view of constant velocity joint with the components assembled.

A plurality of inner tracks 236 are formed in the inner race outer surface 230. Each of the inner tracks 236 has an arcuate profile which follows an arcuate path, the arcuate path having a center point different from a center point of the constant velocity joint 210. The diameter of the arcuate profile of each of the inner tracks 236 is complementary to the diameter of the arcuate profile of each of the outer tracks 226 corresponding thereto. As shown in FIGS. 11 and 13, a depth of each of the inner tracks 236 varies depending on a distance the inner race outer surface 231 is from the axis of the inner race 214. The inner race 214 includes six inner tracks 236 formed therein. However, it is understood that each of the inner tracks 236 may have a non-arcuate profile and any number of the inner tracks 236 may be formed in the inner race 214. The plurality of inner tracks 236 is equally spaced about the axis of the inner race 214.

The inner race 214 is secured to the drive sleeve 218 using a snap ring 238 disposed in a groove 240 formed in an outer surface of the drive sleeve 218. Alternately, any other type of fastener may be used to secure the inner race 214 to the drive sleeve 218.

The cage 216 is disposed between the outer race 212 and the inner race 214. The cage 216 is a hollow body machined from a rigid material such as steel. However, it is understood the cage 216 may be formed using other processes from any rigid material. The cage 216 includes a spherical outer surface 244 and a spherical inner surface 246. A plurality of perforations 248 is formed through the cage 216.

The spherical outer surface 244 has a center point common with the center point of the constant velocity joint 210. The spherical outer surface 244 defines a portion of each of the perforations 248. The spherical outer surface 244 is disposed against and slidingly engages the inner surface 228 of the outer race 212. A diameter of the spherical outer surface 244 is complementary to the inner surface 228 of the outer race 212. The spherical outer surface 244 and the inner surface 228 are precision machined for use as mating surfaces of a constant velocity joint as is known in the art.

The spherical inner surface 246 has a center point common with the center point of the constant velocity joint 210. The spherical inner surface 246 defines a portion of each of the perforations 248. The spherical inner surface 246 is disposed against and slidingly engages the inner race outer surface 230. A radius of the spherical inner surface 246 is complementary to a radius of the inner race outer surface 230. The spherical inner surface 246 and the inner race outer surface 231 are precision machined for use as mating surfaces of a constant velocity joint as is known in the art.

The plurality of torque transferring elements 217 comprises steel spheres disposed in each of the perforations 248, the outer tracks 226, and the inner tracks 236. Each of the torque transferring elements 217 is a ball bearing as is known in the art. However, it is understood that the plurality of torque transferring elements 217 may be any other shape and formed from any other rigid material. A diameter of each of the torque transferring elements 217 is complementary to the diameter of the arcuate profiles of each of the outer tracks 226 and the inner tracks 236. The torque transferring elements 217, the outer tracks 226, and the inner tracks 236 are precision machined for use as mating surfaces of a constant velocity joint as is known in the art. One torque transferring element 217 is disposed and in sliding engagement with each of the outer tracks 226 and each of the inner tracks 236.

The drive sleeve 218 is an annular member formed from a rigid material such as a steel. It is understood that the drive sleeve 218 may be formed using any conventional process from any rigid material. The drive sleeve 218 is disposed against and is in driving engagement with the inner race 214. The drive sleeve 218 comprises a first end portion 250, a middle portion 252, and a second end portion 254. The first end portion 250 is drivingly engaged with the inner race 214, the middle portion 252 is disposed against the inner race 214, and the second end portion 254 is drivingly engaged with the plug-in pinion shaft 222.

The first end portion 250 is a cylindrical shaped portion of the drive sleeve 218 spliningly engaged with the inner race 214. A plurality of splines 255 are formed in an outer surface of the first end portion 250. Alternately, it is understood that the drive sleeve 218 may be unitarily formed with the inner race 214 or coupled thereto in any conventional manner. The groove 240 is formed in the first end portion 250 of the drive sleeve 218.

The middle portion 252 is a substantially disk shaped portion of the drive sleeve 218 located between the first end portion 250 and the second end portion 254. The middle portion 252 has a diameter greater than a diameter of the first end portion 250. The middle portion 252 defines a sleeve seat 256 of the drive sleeve 218. When the first end portion 250 is drivingly engaged with the inner race 214, the sleeve seat 256 is disposed against a portion of the inner race 214.

The second end portion 254 is a hollow portion of the drive sleeve 218 formed opposite the first end portion 250. The second end portion 254 comprises a plurality of inner splines 260, an outer thread 262, a ring groove 263, and a boot groove 264. The second end portion 254 is sealingly engaged with a portion of the boot assembly 220.

The plurality of inner splines 260 is formed on an inner surface 265 of the second end portion 254 for drivingly engaging the plug-in pinion shaft 222. Alternately, it is understood that the second end portion 254 may be coupled to the plug-in pinion shaft 222 in any manner that permits sliding engagement.

The outer thread 262 is formed on an outer surface 266 of the second end portion 254 for threadingly engaging the drive nut 219. Alternately, it is understood that the second end portion 254 may be configured to be engaged with the drive nut 219 in any conventional manner.

The ring groove 263 is an annular recess defined by the outer surface 266 of the second end portion 254. The ring groove 263 receives a sleeve snap ring 267 which in addition to the outer thread 262, secures the drive nut 219 to the drive sleeve 218. Alternately, it is understood that the second end portion 254 may be configured with another feature to secure the drive nut 219 to the drive sleeve 218.

The boot groove 264 is annular recess defined by the outer surface 266 of the second end portion 254. The boot groove 264 is formed intermediate the ring groove 263 and the middle portion 252. The boot groove 264 receives a portion of and is sealingly engaged with the boot assembly 220. Alternately, it is understood that the second end portion 254 may be configured with another feature which receives and sealingly engages the boot assembly 220.

The drive nut 219 is a hollow annular member formed from a rigid material such as a steel. The drive nut 219 is most clearly illustrated in FIG. 14. It is understood that the drive nut 219 may be formed using any conventional process from any rigid material. When the constant velocity joint 210 is assembled, the drive nut 219 is partially disposed about and is threadingly engaged with the drive sleeve 218. The drive nut 219 comprises an inner surface 268 which defines a first snap ring recess 270, a distal inner surface 271, an inner thread 272, a sleeve shoulder 274, and a second snap ring recess 276. The drive nut 219 further comprises an outer surface 278 which defines a fastening portion 280. A plurality of release perforations 282 are formed through the drive nut 219.

The first snap ring recess 270 is an annular recess defined by the inner surface 268 of the drive nut 219. The first snap ring recess 270 receives the sleeve snap ring 267 when the drive nut 219 is disposed and engaged with the drive sleeve 218. Alternately, it is understood that the inner surface 268 may be configured with another feature to secure the drive nut 219 to the drive sleeve 218. As most clearly shown in FIG. 14, the inner surface 268 also defines a first chamfered surface 284 adjacent the first snap ring recess 270 to facilitate removal of the drive nut 219 from the drive sleeve 218 and a second chamfered surface 285 adjacent a distal end of the drive nut 219 to facilitate compression of the sleeve snap ring 267 during assembly of the constant velocity joint 210.

The distal inner surface 271 is an unthreaded portion of the inner surface 268 formed between the first chamfered surface 284 and the second chamfered surface 285. The distal inner surface 271 is most clearly shown in FIG. 14. A diameter of the distal inner surface 271 is greater than a diameter of the inner thread 272.

The inner thread 272 is formed on the inner surface 268 of the drive nut 219 for threadingly engaging the outer thread 262 of the drive sleeve 218. Alternately, it is understood that the inner surface 268 may be configured to be engaged with the drive sleeve 218 in any conventional manner.

The inner surface 268 defines the sleeve shoulder 274 of the drive nut 219. The sleeve shoulder 274 is a stepped portion of the drive nut 219. When the constant velocity joint 210 is assembled, the sleeve shoulder 274 is disposed against the second end portion 254 of the drive sleeve 128.

The second snap ring recess 276 is an annular recess defined by the inner surface 268 of the drive nut 219. The second snap ring recess 276 receives a pinion shaft snap ring 286 to couple the drive nut 219 to the plug-in pinion shaft 222 while permitting relative rotation therebetween. Alternately, it is understood that the inner surface 268 may be configured with another feature to couple the drive nut 219 to the plug-in pinion shaft 222. As most clearly shown in FIGS. 13 and 14, the plurality of release perforations 282 intersects the second snap ring recess 276.

The outer surface 278 defines the fastening portion 280 of the drive nut 219. The fastening portion 280 is a hexagonal shaped portion (not shown) of the drive nut 219 for drivingly engaging a driving tool (not shown); however, it is understood that the fastening portion 280 may include other features formed therein for engaging other drive tools.

Figure 14:
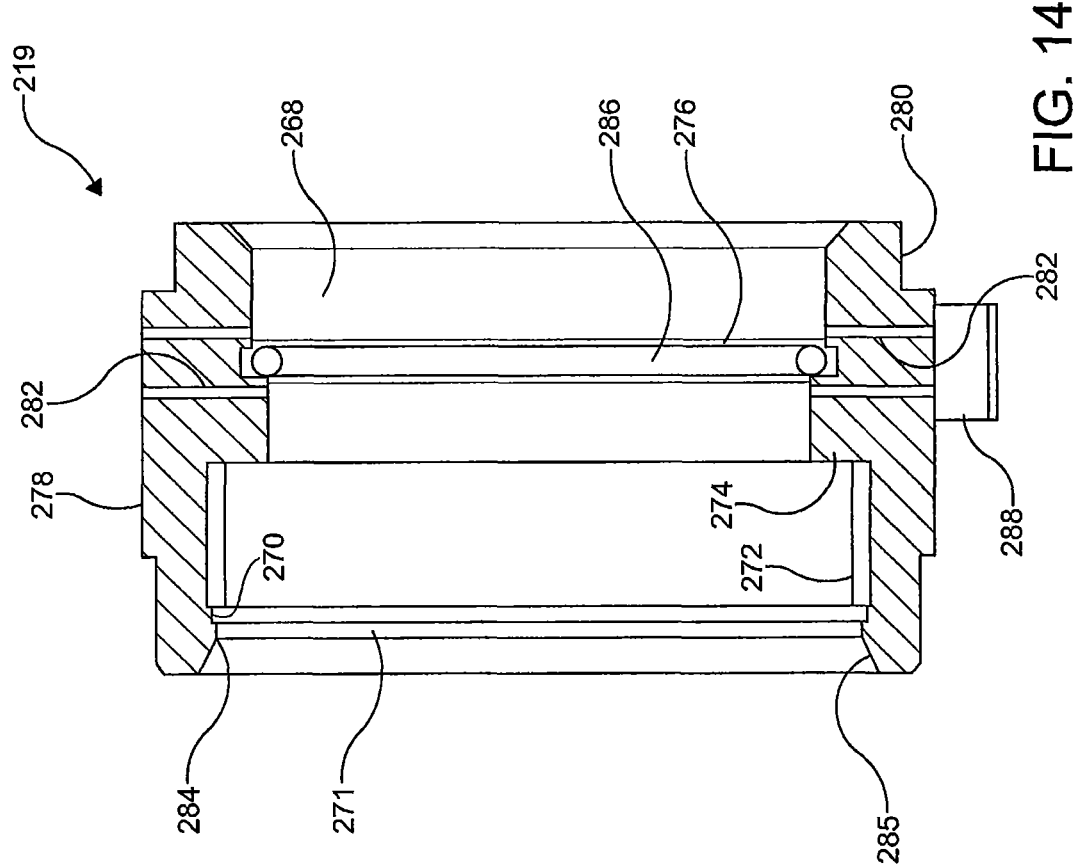
FIG. 14 is a side view of one embodiment of one component of the constant velocity joint.
Figure 15:
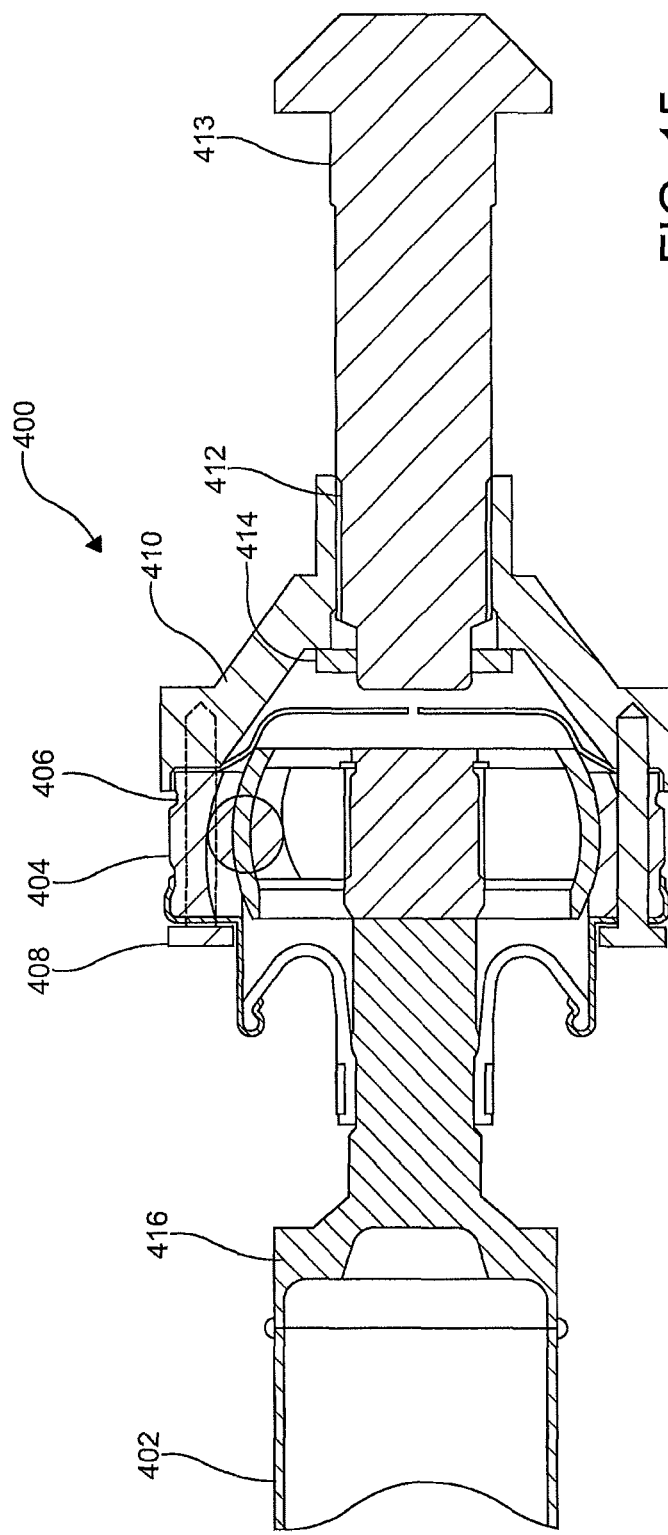
FIG. 15 is a side view of a prior art design.

Each of the release perforations 282 is a threaded perforation formed through the drive nut 219. Each of the release perforations 282 extends from the fastening portion 280 to the second snap ring recess 276. A release fastener 288 is threadingly disposed in each of the release perforations 282. FIGS. 13 and 14 illustrates a release fastener 288 disposed in one of the release perforations 282. In response to a rotation of each of the release fasteners 288, a force applied to the pinion shaft snap ring 286 may be adjusted. In response to an adjustment of force applied to the pinion shaft snap ring 286, a diameter of the pinion shaft snap ring 286 changes.

Figure 12:
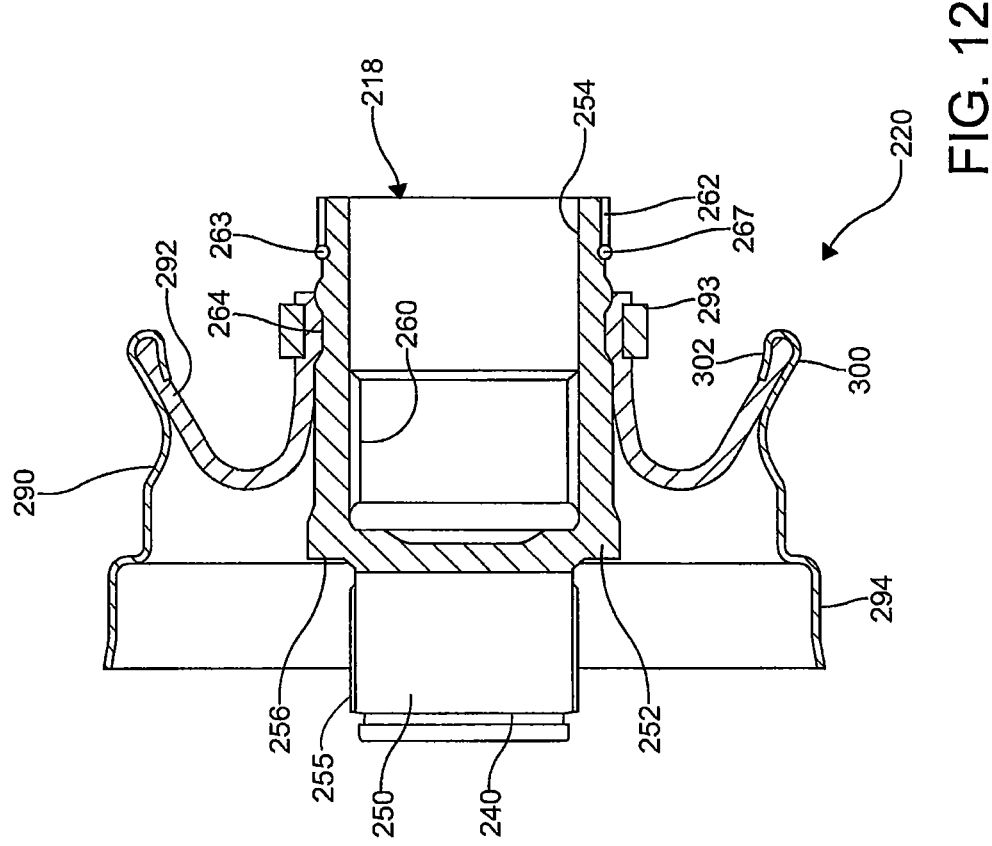
FIG. 12 is a partial cutaway side view of components depicted in FIG. 11.

The boot assembly 220, which is most clearly shown in FIG. 12, comprises a boot retainer 290 and a boot 292. As shown in FIG. 11, the boot assembly 220 is disposed on the outer race 212 and is in sealing engagement with the drive sleeve 218. The boot 292 is coupled to the boot retainer 290 by a crimped portion of the boot retainer 290. The boot 292 is sealingly engaged with the drive sleeve 218 using a clamping device 293. The clamping device is a band style clamp; however, it is understood that other types of clamping devices may be used.

The boot retainer 290 is an annular member formed from a rigid material, such as a metal or a plastic. The boot retainer 290 is coupled to and is sealingly engaged with the outer race 212. A first end portion 294 of the boot retainer 290 engages a shoulder 296 defined by an outer surface 298 of the outer race 212; however, it is understood that the boot retainer 290 may be coupled to the outer race 212 in any manner. A second end portion 300 has a substantially U-shaped cross-section which encloses a portion of the boot 292 to couple the boot 292 to the boot retainer 290. Alternately, the second end portion 300 may have other shapes that facilitate coupling the boot 292 to the boot retainer 290.

The boot 292 is an annular member having a substantially U-shaped cross-section formed from a resilient material, such as an elastomer. The boot 292 facilitates movement between the outer race 212 and the drive sleeve 218 while sealing engagement is maintained therebetween. A first end portion 302 of the boot 292 is coupled to the boot retainer 290 as described hereinabove. A second end portion 304 of the boot 292 is sealingly engaged with and coupled to the boot groove 264 of the drive sleeve 218 as described hereinabove.

The plug-in pinion shaft 222, which is shown in FIG. 13, is an elongate member which is drivingly engaged with the drive sleeve 218 when the constant velocity joint 210 is assembled. The plug-in pinion shaft 222 is formed from a rigid material such as steel using any conventional process. The plug-in pinion shaft 222 comprises a first end portion 306, a middle portion 308, and a second end portion 310.

The first end portion 306 is a cylindrical shaped portion of the plug-in pinion shaft 222 formed opposite the second end portion 310. The first end portion 306 comprises a plurality of outer splines 312 corresponding to the inner splines 260 of the drive sleeve 218. When the constant velocity joint 210 is assembled, the plug-in pinion shaft 222 is drivingly engaged with the drive sleeve 218 through the splines 312, 260. The plurality of outer splines 312 is formed on an outer surface 314 of the plug-in pinion shaft 222. Alternately, it is understood that the plug-in pinion shaft 222 may be drivingly engaged with the plug-in pinion shaft 222 in any manner that permits sliding engagement.

The middle portion 308 is a cylindrical shaped portion of the plug-in pinion shaft 222 formed between the first end portion 306 and the second end portion 310. The outer surface 314 defines a shaft snap ring recess 316 and an O-ring recess 317 in the middle portion 308. The shaft snap ring recess 316 receives a pinion shaft snap ring 286 to couple the drive nut 219 to the plug-in pinion shaft 222 while permitting relative rotation therebetween. The O-ring recess 317 receives an O-ring 318 to effect sealing engagement between the plug-in pinion shaft 222 and the drive nut 219 when the constant velocity joint 210 is assembled The second end portion 310 is configured to be drivingly engaged with a drive component (not shown). As most clearly shown in FIG. 13, the second end portion 310 is a beveled pinion gear; however, it is understood that the second end portion 310 may be configured in any manner that permits driving engagement between the plug-in pinion shaft 222 and the drive component.

In use, the constant velocity joint 210 including the drive sleeve 218, the drive nut 219, and the plug-in pinion shaft 222 facilitates assembly and disassembly of the constant velocity joint 210. In FIG. 13, the drive nut 219 is rotatably coupled to the plug-in pinion shaft 222 with the pinion shaft snap ring 286, which is partially disposed in the second snap ring recess 276 and the shaft snap ring recess 316.

Assembly of the constant velocity joint 210 is performed through the following steps. First, the first end portion 306 of the plug-in pinion shaft 222 is disposed in the second end portion 254 of the drive sleeve 218. The outer splines 312 of the plug-in pinion shaft 222 are aligned with the inner splines 260 of the drive sleeve 218 and the plug-in pinion shaft 222 is inserted into the drive sleeve 218 until the inner thread 272 of the drive nut 219 contacts the outer thread 262 of the drive sleeve 218. Next, the drive nut 219 is rotated on the plug-in pinion shaft 222 to engage the inner thread 272 with the outer thread 262. The drive nut 219 is rotated until the second chamfered surface 285 contacts the sleeve snap ring 267. Further rotation of the drive nut 219 causes the second chamfered surface 285 to apply a radially inwardly directed force to the sleeve snap ring 267, compressing the sleeve snap ring 267 against the distal inner surface 271. Once the sleeve snap ring 267 is compressed against the distal inner surface 271 of the drive nut 219, the inner thread 272 is free to further engage the outer thread 262 through further rotation of the drive nut 219. The distal inner surface 271 of the drive nut 219 reduces a rotational resistance between the drive nut 219 and the drive sleeve 218, facilitating assembly of the constant velocity joint 210 and the plug-in pinion shaft 222. The drive nut 219 is further rotated until the first snap ring recess 270 is substantially aligned with the sleeve snap ring 267 and the ring groove 264. Once the first snap ring recess 270 is substantially aligned with the sleeve snap ring 267 and the ring groove 264, the sleeve snap ring 267, expands partially into the first snap ring recess 270 while also remaining in the ring groove 264.

FIG. 13 illustrates the sleeve snap ring 267 expanded partially into the first snap ring recess 270 while also remaining in the ring groove 264. Such a position of the sleeve snap ring 267 militates against rotation of the drive nut 219 with respect to the drive sleeve 218 and the plug-in pinion shaft 222. Such a position of the sleeve snap ring 267 also militates against an axial movement of the plug-in pinion shaft 222, which prevents the outer splines 312 of the plug-in pinion shaft 222 from becoming disengaged from the inner splines 260 of the drive sleeve 218.

Removal of the plug-in pinion shaft 222 from the constant velocity joint 210 is performed through the following steps. Removal of the plug-in pinion shaft 222 from the constant velocity joint 210 begins by displacing the pinion shaft snap ring 286 from the second snap ring recess 276. The pinion shaft snap ring 286 is displaced from the second snap ring recess 276 by the release fasteners 288. Each of the release fasteners 288 are adjusted to further extend radially inwardly within the release perforations 282, causing each of the release fasteners 288 to contact the pinion shaft snap ring 286. Contact between each of the release fasteners 288 and the pinion shaft snap ring 286 applies a radially inwardly directed force to the pinion shaft snap ring 286, compressing the pinion shaft snap ring 286 and displacing the pinion shaft snap ring 286 from the second snap ring recess 276. Once the pinion shaft snap ring 286 is displaced from the second snap ring recess 276, the plug-in pinion shaft 222 may be moved axially with respect to the drive nut 219, and the plug-in pinion shaft 222 may be disengaged from the drive sleeve 218 by applying an axially directed force to the plug-in pinion shaft 222 away from the drive sleeve 218.

Disassembly of the constant velocity joint 210 may continue by removing the drive nut 219 from the drive sleeve 218. The drive nut 219 is rotated to disengage the inner thread 272 of the drive nut 219 from the outer thread 262 of the drive sleeve 218. The drive nut 219 is rotated until the first chamfered surface 284 contacts the sleeve snap ring 267. Further rotation of the drive nut 219 causes the first chamfered surface 284 to apply a radially inwardly directed force to the sleeve snap ring 267, compressing the sleeve snap ring 267 against the distal inner surface 271 of the drive nut 219. Once the sleeve snap ring 267 is compressed against the distal inner surface 271 of the drive nut 219, the inner thread 272 is free to be further disengaged from the outer thread 262 through further rotation of the drive nut 219. The distal inner surface 271 of the drive nut 219 reduces a rotational resistance between the drive nut 219 and the drive sleeve 218, facilitating disassembly of the constant velocity joint 210 and the plug-in pinion shaft 222. The drive nut 219 is further rotated until the inner thread 272 is fully disengaged from the outer thread 262, at which point the drive nut 219 may be removed from the drive sleeve 218.

The constant velocity joint 210 according to the invention offers many advantages over a conventional constant velocity joint. The constant velocity joint 210 according to the invention eliminates a need for many components conventionally forming a portion of the conventional constant velocity joint or components used adjacent the conventional constant velocity joint. The constant velocity joint 210 eliminates a need for a flange portion of an outer race of the conventional constant velocity joint, an input shaft flange of the conventional constant velocity joint, a stub shaft, a lock nut, and a plurality of fasteners used to couple components of the conventional constant velocity joint together. The constant velocity joint 210 also reduces a length of the plug-in pinion shaft 222 through the use of the drive sleeve 218, which improves a manufacturability of a vehicle including the constant velocity joint 210 and the plug-in pinion shaft 222. Additionally, the drive nut 219 including the release perforations 282 increases a serviceability of the constant velocity joint 210 and reduces damage that can occur to the conventional constant velocity joint during servicing. When compared to the conventional constant velocity joint, the constant velocity joint 210 according to the invention is of a reduced weight and has a reduced cost of manufacture associated therewith.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:
1. A constant velocity joint, comprising:
an inner race with a first set of splines;
a sleeve with a first end portion, a second end portion and a middle portion, said first end portion having a second set of splines engaged with said first set of splines, said middle portion abutting said inner race and said second end portion having a first set of threads and a boot groove on an outer surface and a third set of splines on an inside surface, said sleeve having a sleeve snap ring groove on said second end portion;

a drive nut with an inner surface having a second set of threads engaged with said first set of threads, a first snap ring groove, a second snap ring groove and a plurality of release perforations;

a pinion shaft with a fourth set of splines engaged with said third set of splines, a pinion shaft snap ring groove and an o-ring groove;

a first snap ring in said sleeve snap ring groove and said drive nut first snap ring groove and a second snap ring in said pinion shaft snap ring groove and the drive nut second snap ring groove; and a release fastener in each of said release perforations.

2. The joint of claim 1, wherein a first end portion of a boot is located in a boot groove and a clamping device contacts said boot to secure it in said boot groove.

3. The joint of claim 2, wherein a second end portion of said boot is located in a boot retainer that is in contact with an outer surface of an outer race.

\* \* \* \* \*